US005641397A

United States Patent [19]

Grienberger

[11] Patent Number: 5,641,397

[45] Date of Patent: Jun. 24, 1997

[54] DEVICE FOR SEPARATING INORGANIC MATERIAL POLLUTED BY ORGANIC MATERIAL FROM A FLUID

[75] Inventor: Johann Grienberger, Hilpoltstein, Germany

[73] Assignee: Hans Huber GmbH Maschinen-und Anlagenbau, Berching, Germany

[21] Appl. No.: 564,325

[22] PCT Filed: Sep. 22, 1994

[86] PCT No.: PCT/EP94/03167

§ 371 Date: Dec. 19, 1995

§ 102(e) Date: Dec. 19, 1995

[87] PCT Pub. No.: WO95/30486

PCT Pub. Date: Nov. 16, 1995

[30] Foreign Application Priority Data

May 4, 1994 [DE] Germany .......................... 44 15 647.2

[51] Int. Cl.$^6$ .......................... B01D 43/00; B01D 12/00; B01D 21/24

[52] U.S. Cl. .......................... 210/97; 210/219; 210/515; 210/519; 210/523; 210/532.1; 422/211; 422/213; 422/216; 422/225

[58] Field of Search .................................... 210/194, 205, 210/207, 208, 218, 219, 513, 515, 519, 523, 532.1, 97; 422/211, 212, 213, 214, 215, 216, 217, 224, 225

[56] References Cited

U.S. PATENT DOCUMENTS

| | | | |
|---|---|---|---|
| 3,579,443 | 5/1971 | Horst | 210/210 |
| 3,940,252 | 2/1976 | Reinhardt et al. . | |

FOREIGN PATENT DOCUMENTS

| | | |
|---|---|---|
| 359 009 | 10/1980 | Austria . |
| 1386847 | 1/1965 | France . |
| 41 18 020 | 12/1992 | Germany . |
| 42 24 047 | 1/1994 | Germany . |
| 55-116690 | 8/1980 | Japan . |
| 57-42354 | 3/1982 | Japan . |
| 89-212994 | 8/1989 | U.S.S.R. . |

OTHER PUBLICATIONS

"Development of a Sand Recycling Plant for Sewage Treatment Works", H. Klinger, H. Barth, Ludwigsburg, pp. 48, 49, 50, and 53.

*Primary Examiner*—David A. Reifsnyder
*Attorney, Agent, or Firm*—Thomas, Kayden, Horstemeyer & Risley

[57] ABSTRACT

A device for separating inorganic material polluted by organic material from a fluid, especially of sand polluted by organic material in sewage devices, is provided with a circular shaped container (1), which in its upper region has a feed device (19) for the introduction of the fluid into the container (1), with an extractor device (32) for the inorganic material positioned in the lower region (7) of the container (1) and with an extractor device (29) to discharge the organic material and the fluid. A fluidized sand bed (14) is provided in the lower region (7) of the container (1) in order to separate the organic material from the inorganic material. The fluidized sand bed (14) is kept in motion by an upward flow of liquid distributed via a perforated base (8). A by-pass (38) is provided to transfer part of the sand from the fluidized sand bed (14) into the extractor device (32) in the lower region (7) of the container (1).

16 Claims, 6 Drawing Sheets

DEVICE FOR SEPARATING INORGANIC MATERIAL POLLUTED BY ORGANIC MATERIAL FROM A FLUID

FIELD OF THE INVENTION

The invention relates to a device for separating inorganic material polluted by organic material from a fluid, especially of sand polluted by organic material in sewage devices, with a circular shaped container, which in its upper region has a feed device for the introduction of the fluid into the container, with an extractor device for the inorganic material positioned in the lower region of the container and with an extractor device to discharge the organic material and the fluid. Especially the material, taken out of a sand trapping device of a sewage treatment plant or taken out of discharge channels when cleaning or taken during the cleaning procedure of streets, contains beside the inorganic material like sand, stones and the like often a substantial amount of organic material. The inorganic material must be cleaned and separated to a certain degree from the organic material in order to deposit it at low costs.

BACKGROUND OF THE INVENTION

A device of the type described above is known from DE 42 24 047 A1. The device comprises a container shaped concentrically to a vertical axis. The container has a feed device positioned in the middle in the upper region. The feed device comprises a spinning chamber, a gravity pipe, and a trumpet-shaped diffusor, thus using the COANDA-effect. The device is used primarily to deposit sand out of a mixture of sand and liquid in a circular settlement tank. The sand depositing in the lower region of the tank depending on the gravity will be extracted by an extractor device designed as a screw conveyor device. The sand, especially out of sewage treatment plants, and the organic material adhere to each other more or less so that a large amount of the organic material is extracted and conveyed with the sand. Very fine distributed organic material only, which is in a suspending or floating state, is extracted via an overflow of the tank and is extracted together with the liquid. From the periodical Korrespondenz Abwasser, 1/94, pages 48 to 53 (Klinger/Barth "Entwicklung einer Sandrecyclinganlage für Kl äranlagen) a plant for recycling sand is known having a number of singular devices connected to each other. Thus, the material to be treated first is introduced into an oscillating screen in order to separate the larger parts. The material, having passed the oscillating screen, together with liquid is introduced into a classification device having an upward flow to separate the organic material from the sand. The introduction occurs via a hydrocyclone into the classification device. Finally, a dewatering screen with an excentrical drive is used. This effort of devices, tubes and pipes may be justified for complex separation purposes. For the separation of sand out of sewage treatment plants an effort as low as possible is necessary and an operation at low cost. The known plant is designed for relatively large amounts. It is difficult to use the plant for smaller quantities and/or to operate the plant intermittently. In addition, it is not possible to treat the mixtures of sand and liquid typical for sewage plants.

SUMMARY OF THE INVENTION

It is an object of this invention to provide a device of the type mentioned above, with which inorganic sand/liquid mixtures polluted by organic material as known from sewage clarification plants may be cleaned in a manner to separate the organic material from the inorganic material to the greatest possible extent so that the organic material may be treated further in a clarification plant and the inorganic material may be recycled or deposited at low cost.

According to the invention this is realized with a device of the type mentioned above, wherein a fluidized sand bed is provided in the lower region of the container in order to separate the organic material from the inorganic material, the fluidized sand bed is kept in motion by an upward flow of liquid distributed via a perforated base, and a by-pass is provided to transfer part of the sand from the fluidized sand bed into the extractor device in the lower region of the container.

The invention is based on the idea of reaching a substantially more effective separation between the organic and the inorganic material. For this purposes a fluidized sand bed in kept in motion in the lower region of the container as a fluidization zone, whereby the motion of the sand particles results in an effect of cutting up, separating, crushing and conveying the organic material upwardly in order to extract the organic material together with the liquid. The mixture of sand and fluid polluted by organic material, which is introduced into the container by the feed device using the COANDA-effect, whereby the vertical spinning effect in the gravity pipe is converted into a substantially horizontally spinning flow. This special manner of feeding results in a movement of the organic material with respect to the inorganic material. However, even using a normal feed device particles having a higher density and a larger volume are concentrated in the lower part of the container, while smaller particles with relatively low density follow the flow of the liquid and may be extracted by a device forming an overflow of the container. The fluidized sand bed acts upon the organic material so that it is forced upwardly again if it has been introduced into the fluidized bed together with inorganic material. Thus, the organic material is collected above the fluidized sand bed, while the inorganic material, i.e. the sand, is introduced into the fluidized bed increasing the amount of sand. The increase of the amount of sand within the fluidized bed results in a more effective cleaning process and thus, a self-intensification effect occurs. The fluidized sand bed is kept in motion by a upwardly directed flow of liquid, which is distributed over the surface by a perforated base. Thus, a fluidized sand bed appears. The speed of the liquid flow in upward direction in an empty tube or container is about 5 to 15 meters/hour. Depending on the high density of the sand all material having a lower density, i.e. the organic material, will deposit on top of the sand bed. To keep the extending height of the fluidized sand bed constant part of the sand is extracted, which can be done continuously or intermittently. The by-pass serves to penetrate or bridge the perforated base and to extract a part of the sand into the lower region of the container to keep the extending height of the fluidized bed about constant. The by-pass is adapted to make relatively large particles of inorganic material, like stones, possible to reach the lower region of the container to be extracted together with the sand.

The container is provided with a collecting chamber for the organic material, positioned directly above the upper limit of the extension of the fluidized sand bed and having a cross-section which widens in upward direction. At least the lower part of the collecting chamber above the fluidized bed has the widening cross section in upward direction. Depending on the increase of the cross sectional area the speed of the flow of the liquid in decreased in upward direction so that only very fine crushed organic material gets into a suspension or floating state, while larger organic particles will sink by gravity into the fluidized bed and will be crushed to smaller dimensions making it possible to float or to be suspended with the upwardly directed flow of liquid. At the same time the speed of the flow decreasing in upward direction prevents the floating of very fine inorganic particles. Small sand particles are not extracted in the upper part of the container, but can sink downwardly. The speed of the upwardly directed flow of liquid has a maximum just above the perforated base if the container wall is designed in this region conically also. The uniform stream or flow of the liquid in the region above the perforated base results in a motion so that even larger stones are kept in motion within the fluidized bed till they reach the by-pass and are extracted out of the sand bed. It is also possible that the container has a throughout conical shape from the bottom in upward direction to the cover. This is advantageous, because depending on the conditions of a sewage clarification plant the feeding of the device is performed with a mixture of sand and liquid, the larger amount of this being water. Depending on the large volume in the upper region of the container and with respect to the feeding device a larger amount of mixture may be introduced without difficulties and without a change in the conditions within the fluidized sand bed. The device is not sensitive to variations in transfer rate of the material. The device can be operated continuously or intermittently and may be used for little and for large quantities of material. The apparatus expenditure is relatively low compared with known devices. The operation is possible at low cost which is a precondition in the sewage treatment technology. In addition, the inorganic material is cleaned effectively. Results may be obtained in which only about 5% of organic material or even less adheres to the inorganic material being extracted by the extractor device.

A stirring apparatus may be provided within the container, the stirring apparatus having driven agitator blades which are positioned in the lower region of the fluidized sand bed and/or in the lower region of the collecting chamber. The agitator blade is positioned to face the perforated base and has two functions. The agitator blade prevents the forming of channels in the lower part of the fluidized sand bed and helps the sand bed to be uniformly be streamed through. Channels which have built are destroyed by the agitator blade. On the other hand organic items, especially parts with areas, like papers, leafs or the like, which have purely by chance reached the lower region of the fluidized sand bed, are stopped, removed by the motion of the agitator blade, and float upwardly together with the liquid. The other agitator blade is positioned just above the limit of the fluidized sand bed between the sand bed and the collecting chamber. It loosens the organic material above the fluidized sand bed during its rotation so that the organic material is removed and floated, thus making it possible for new sinking sand particles to penetrate this zone and to reach the fluidized sand bed. The motion of the agitator blades results in a mechanical treatment of the organic material and a reduction in size so that the organic particles may be floated upwardly by the upstreaming liquid.

A supporting plate with closed surface may be positioned horizontally within the container and allocated to an agitator blade of the stirring apparatus. The supporting plate obstructs only a part of the cross sectional area in the container in the vertical direction. The arrangement of the supporting plate within the container makes the setting of sinking inorganic material, i.e. sand, on top of the supporting plate possible. The agitator blade will move through the deposited sand which is no part of the fluidized sand bed at this moment and will stress the sand mechanically so that an effective loosening of the organic material is results by this rubbing movement. At the same time a conveying effect is reached by the rotation of the agitator blade. Thus, the sand can pass the edge of the supporting plate and fall back into the fluidized sand bed. So the supporting plate is ready to accept further material sinking down in the container. Above the supporting plate a mechanical wash- and cleaning Zone is created.

The perforated base may have two walls, the upper wall of which is provided with a number of openings uniformly distributed over the surface and the lower wall of which is closed, and a tube is provided extending through the perforated base in vertical direction and forming a by-pass. The tube may be positioned in the middle of the perforated base. The tube also may be replaced by a simple hole having a substantially larger cross sectional area than the number of nozzle-like openings distributed on the surface of the perforated base, through which the liquid is ejected for the fluidization of the sand bed. The double-walled perforated base is connected with a pipe for liquid containing a pump to generate an upwardly directed flow of liquid. Controlling the pump adjusts the extension height of the fluidized sand bed. The openings in the perforated base, through which the liquid is ejected, may have a diameter of 1 mm or less. The free cross sectional area of all of the openings is about between 1 and 10% of the entire surface area of the perforated base. The perforated base may be covered by a membrane having openings which are formed like check valves so that the openings are open only for the times the pump is actuated. In stillstands in which the device is not operated the sand sinks down on the now closed upper surface of the perforated base. Thus, the entering of the interior of the perforated base by the sand is prevented.

A substantially cylindrically shaped insert may be provided within the container, which is allocated to the perforated base and which serves to limit the extension of the fluidized sand bed. This insert may be designed replaceable. Different inserts having different diameters may be lodged in one container to have devices adapted to different flow rates at low cost. If the insert is cylindrically shaped, then the speed of the flow over its height is constant and thus the extension height of the fluidized sand bed is constant. The cylindrical insert may also carry the supporting plate which in this case has a ring-like shape.

The fluidized sand bed may have an extension height of about 20 to 40 cm. This guarantees a sure crushing of even larger organic particles which may have entered the region of the fluidized sand bed and are floated upwardly again.

A valve may be provided in the tube extending through the perforated base and a pressure sensor may be provided in the container, the sensor having connection to the fluidized sand bed. The valve is controlled by the pressure sensor in order to detect, control and keep constant the extension height of the fluidized sand bed. The hydrostatic pressure of the fluidized sand bed is detected by the sensor. An increase of the pressure is a measurement for a thickening of the fluidized sand bed so that the valve must be opened or more opened and vice versa. But it is also possible to measure the extension height of the fluidized sand bed by a level indicating tube.

The exact operation of the device depends on the range of size of the organic material and the flow rate of the liquid. With increasing flow rate the organic material on the fluidized sand bed will be extracted out of the container with an increasing amount by the liquid. On the other hand at low flow rates the organic material will concentrate within the container. A high hydraulic flow rate is an advantage for the extraction of organic material. But as far as the inorganic sand is concerned this is a disadvantage because more and more fine sand will be extracted together with the liquid. The flow rate used in connection with the size of the container must not be too large to keep the undesired loss of fine sand low. A ratio of flow rate to the volume of the container free for flow of about 20 l/(sec.m$^3$) is useful to guarantee the cleaning effectiveness needed in sewage treatment technology. The volume of the container free for flow will be reduced during operation because larger organic material will be accumulated in the container. To counteract to this disadvantage the extractor device to discharge the organic material and the liquid is split up, i.e. a first extractor device substantially for the organic material and a second extractor device substantially for the liquid are provided. The extract or removal of the organic material preferably is controlled intermittently.

The first extractor device for the organic material may comprise a tube extending through the wall of the container in the region of the collecting chamber. The tube is fixed in the needed height adapted to the collecting chamber. A valve is provided within the tube of the connected pipe and serves for intermittent operation.

The first extractor device for the organic material also may comprise a suction pipe extending about vertically into the collecting chamber. The suction pipe may be arranged in adjustable manner to draw off the organic material exactly in the adjusted deepness within the collecting chamber.

The described devices may be operated in different manner. It is advantageous to fill the container first with liquid, organic and inorganic material. Then the device is actuated, i.e. a fluidized sand bed is generated and the stirring apparatus is started. Thus, the sand is cleaned, the organic material will float upwardly and the sand in the opposite direction. Separation will occur and the discharge of the cleaned sand also. Preferably, the organic material is then discharged. The discharge of liquid is done continuously during continuous feeding operation.

BRIEF DESCRIPTION OF THE DRAWINGS

The invention is described in more detail with respect to preferred embodiments. The drawings show.

DETAILED DESCRIPTION

Figure 1:
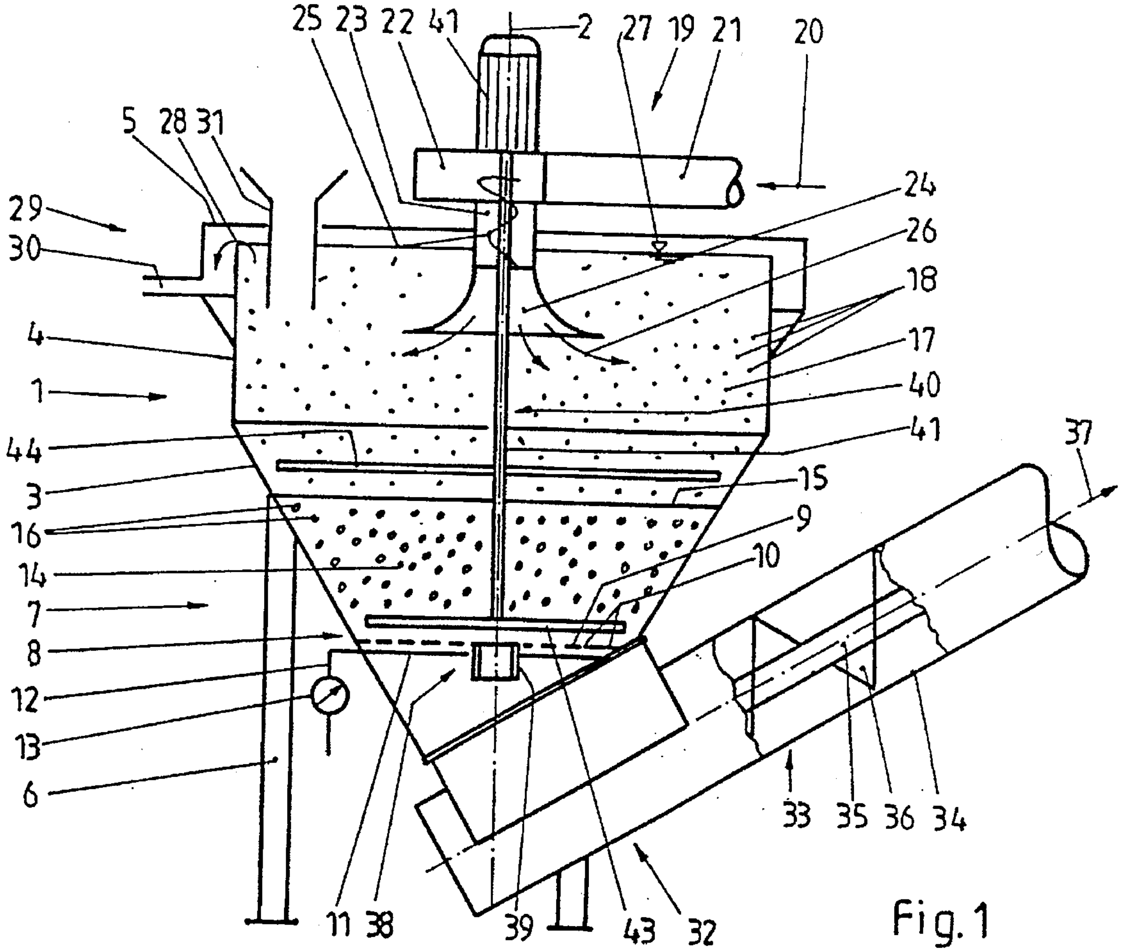
FIG. 1 is a schematical vertical cross section through a first embodiment of the device.
Figure 2:
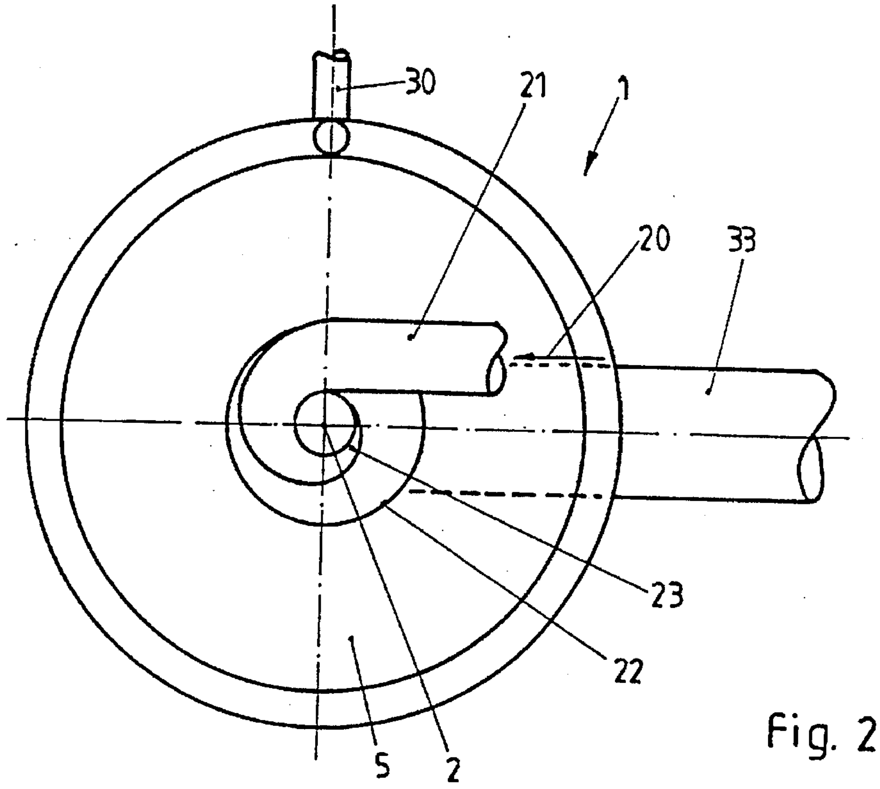
FIG. 2 is a top view of the device of FIG. 1.

In FIG. 1 the essential elements of the device are illustrated. A container 1 is provided having an axis 2. It is a round container 1 arranged symmetrically to the axis 2. The container 1 in its lower region has a wall 3 of conical shape, connected with a cylindrical designed wall 4. The container may be provided with a cover 5. The diameter of the container may be one or more meters. Pillars 6 may be provided for standing purposes.

A perforated base 8 is horizontally positioned in the lower region 7 of container 1. The perforated base 8 has a double wall. Its upper wall 9 is provided with openings 10 regularly distributed about the area and in the shape of nozzles. The downwardly facing wall 11 is closed. The space between the walls 9 and 11 is connected to a pipe 12 having a pump 13 and via which the liquid is lead into the interior of the perforated base 8 between walls 9 and 11. The liquid ejects through the openings 10 directed upwardly in the container. A fluidized sand bed 14 is provided above the perforated base 8 and kept in motion by the liquid ejecting from the perforated base 8. The sand bed 14 has a height up to a limit 15 illustrated as a line. The moving sand particles 16 in the fluidized sand bed 14 are shown in exaggerated manner. Depending on the amount of sand in the container the fluidized sand bed 14 will increase more or less in its height. A collecting chamber 17 for organic material 18 is provided above the limit 15 of the sand bed 14.

A mixture of sand and water polluted by organic material is introduced into the container via a feed device 19 in direction of arrow 20. An inlet pipe 21 extends tangentially into a spinning chamber 22 with angular momentum connected with a gravity pipe 23 and a trumpet-shaped diffusor 24. The mixture of liquid, organic material, and inorganic material is introduced into the container 1 according arrow 25 with an spinning motion and is distributed more or less radially according arrows 26 into the collecting chamber 17. The diffusor 24 is positioned below the liquid level 27. The liquid level 27 is adjusted within the container by an overflow 28 of a device 29 to discharge the organic material 18 and the fluid. The overflow 28 is connected with an extractor pipe 30.

An inlet pipe 31 may also be provided in the upper part of container 1 extending through the cover 5. A mixture of polluted sand, especially dirt collected on streets, may be introduced here falling into the liquid and being treated in the described manner.

An extractor device 32 for the inorganic material is provided in the lower region 7 of the container 1 downstream of the perforated base 8. The extractor device 32 may be designed as a screw conveyor 33 having a housing 34, a shaft 35, and a screw 36. A drive is provided for the screw conveyor 33 and the extractor device 32 respectively actuated continuously or intermittently so that the inorganic material is extracted in direction of arrow 37. A by-pass 38, for example a tube 39 extending through the perforated base 8 in vertical direction, is provided making the inorganic material, i.e. the sand particles 16 collected in the sand bed, possible to escape from the fluidized sand bed 14 downwardly and through the perforated base 8. The tube 39 is positioned concentrically to the axis 2 of the container, on the one hand closing the interior of the perforated base 8 between walls 9 and 11 and on the other hand making the particles 16 possible to escape from the region of the fluidized sand bed 14 into the region of the extractor device 32. Thus, the height of the fluidized sand bed 14 up to the limit 15 may be kept constant.

A stirring apparatus 40 is positioned concentrically in the container 1 and about the axis 2 which has a vertical shaft 41 driven by a motor 42. The shaft 41 is provided with agitator blades 43 located just above the perforated base 8. One or more of the agitator blades 43 may be provided. The agitator blades, driven with low speed, effect that channels within the fluidized bed 14 cannot be generated above the perforated base 8 and if this occurs, such channels are destroyed immediately. The sand particles 16 of the fluidized bed 14 here are also treated, rubbed, and cleaned mechanically by the agitator blades 43. Further agitator blades 44 may be fixed on the shaft 41, which are allocated to the upper limit 15 of the fluidized bed 14 and thus are positioned in the lower region of the collecting chamber 17. These agitator blades 44 are positioned in order to avoid a dense setting of organic material 18 on the fluidized bed 14 and to keep the organic material always moved, crushed, and mixed. This serves the sinking sand particles 16 to penetrate the organic material 18 and to be incorporated into the fluidized bed 14. On the other hand the ability of further crushed organic material 18 is improved so that it can float upwardly into collecting chamber 17 and may be extracted via the overflow 28.

The device of FIG. 1 may be actuated as follows: The sand bed 14 is fluidized within the container 1. Liquid is ejected from the openings 10 of the perforated base 8 in upward direction via pump 13 and pipe 12, thus, extending the sand bed 14 and keeping it extended. Liquid polluted by organic material is introduced in direction of arrow 20 via the feed device 19 and reaches the region below the liquid level 27 with a distribution in spinning motion as illustrated by arrows 25 and 26. The particles depending on their sizes will move within the collecting chamber 17. Larger particles 16 will sink and reach the region of the fluidized bed 14 increasing here the amount of sand. Organic material 18 will be moved in the collecting chamber 17, larger particles of which will sink quicker than finer particles. A large amount of the organic material 18 will be collected above the limit 15 of the fluidized bed 14. Finer organic material 18 will be extracted via the overflow 28, while larger particles of organic material will be broken and crushed till they reach a size adapted for suspension and subsequent extraction by the liquid ejected from the perforated base 8. The stirring apparatus 40 with its agitator blades 43 and 44 serves for cleaning and moving purposes. Sand particles 16 out of sand bed 14 can penetrate downwardly via the tube 39. This cleaned sand is extracted and conveyed upwardly by the extractor device 32. This occurs in a manner so that the height of the fluidized sand bed 14 up to the limit 15 is kept about constant.

Figure 3:
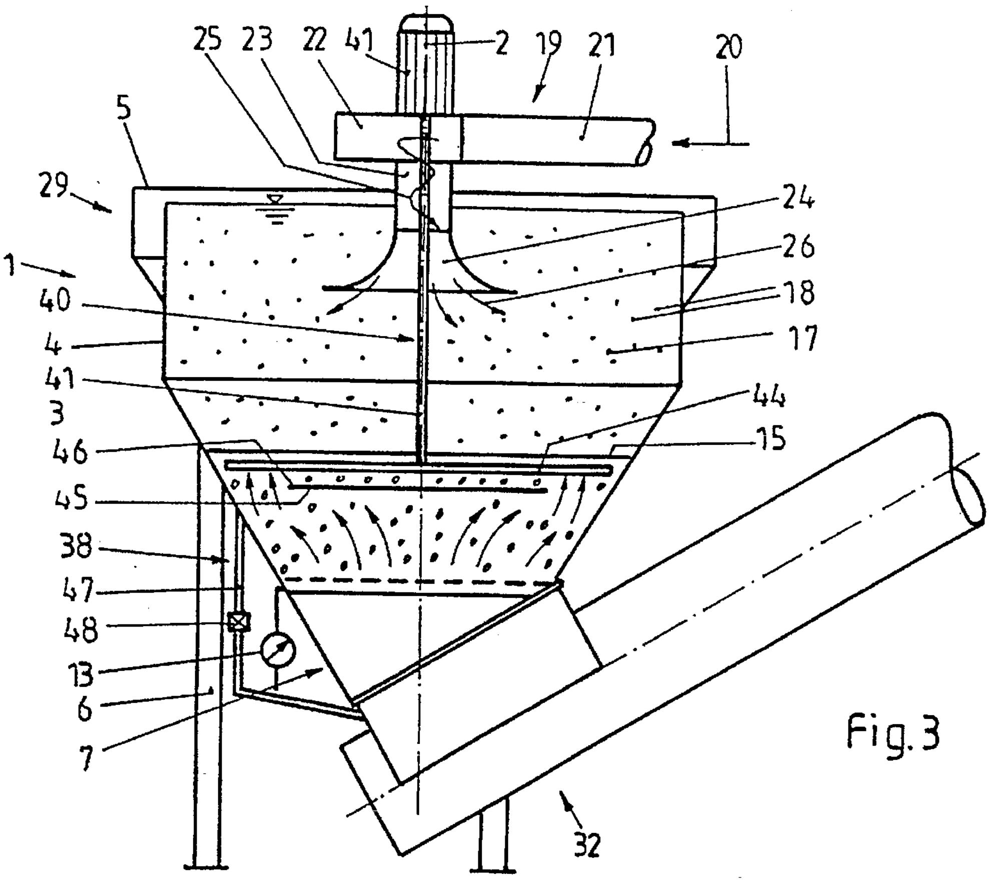
FIG. 3 is a view similar to FIG. 1 showing a second embodiment of the device.

The embodiment of the device shown in FIG. 3 is similar to the embodiment of FIG. 1 and its description. But the stirring apparatus 40 has a shorter shaft 41 provided with agitator blades 44 only, which work just below the limit 15 of the fluidized sand bed 14. A supporting plate 45 is provided an allocation to the agitator blades 44. The supporting plate 45 is positioned in the fluidized bed 14, however, making it possible for material to set on its upper surface and being not influenced by the fluidized bed 14. This setting material is moved by the agitator blades 44, rubbed, cut up, and separated, whereby also a conveying motion occurs so that it is transferred to a larger radius of the supporting plate and finally falls from its edge 46. This falling material will be substantially cleaned sand particles 16 incorporated into the fluidized bed 14, while the organic material after its cutting up by the driven agitator blades 44 will float upwardly in the direction to the collecting chamber 17.

The perforated base 8 here is designed over the entire surface having no penetrating tube. A by-pass pipe 47 serves the sand to by-pass the perforated base 8. The pipe 47 connects the fluidized bed 14 and the lower region 7 of the container 1, thus making it possible that the sand can be extracted via the extractor device 32. A valve 48 is arranged in the by-pass pipe 47 for controlling purposes.

Figure 4:
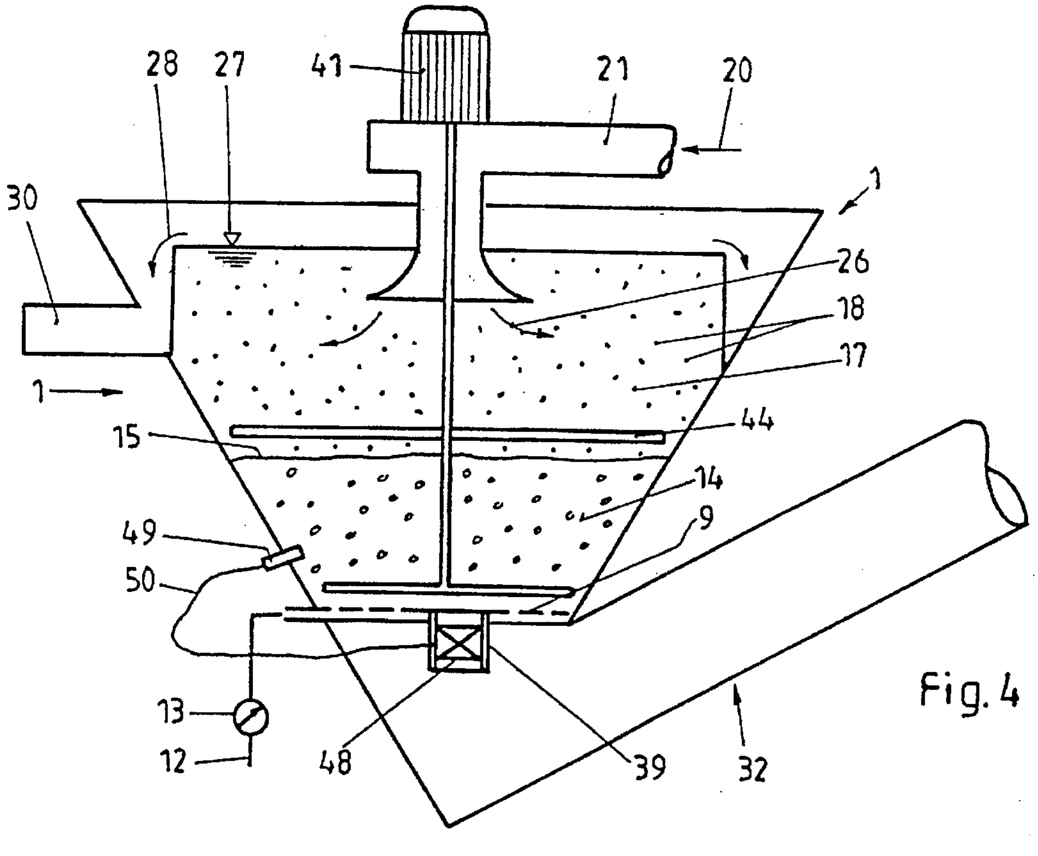
FIG. 4 is a similar view of a third embodiment of the device.

The embodiment shown in FIG. 4 comprises a container 1 which has a conical cross-section over its entire height. There is connection to the extractor pipe 30 via a cylindrically shaped overflow 28. The stirring apparatus 40 is provided with agitator blades 43 and 44. A pressure sensor 49 is provided in the wall of the container 1 in the region of the fluidized sand bed 14. The sensor 49 is connected to the valve 48 via an electrical line 50. The valve 48 is positioned concentrically in the tube 39 penetrating the perforated base 8. The static pressure in the region of the fluidized sand bed 14 is detected by the pressure sensor 49. Rising pressure is a measurement for the upward extension of the fluidized bed 14 in the container, thus, the valve 48 is opened and vice versa so that in this manner the extension height of the fluidized sand bed 14 up to the limit 15 can be kept constant. The speed of the streaming in the container 1 will decrease from below in the upward direction as to the increasing cross section of the container. Thus, only small sized particles of the organic material will be extracted via the overflow 28.

Figure 5:
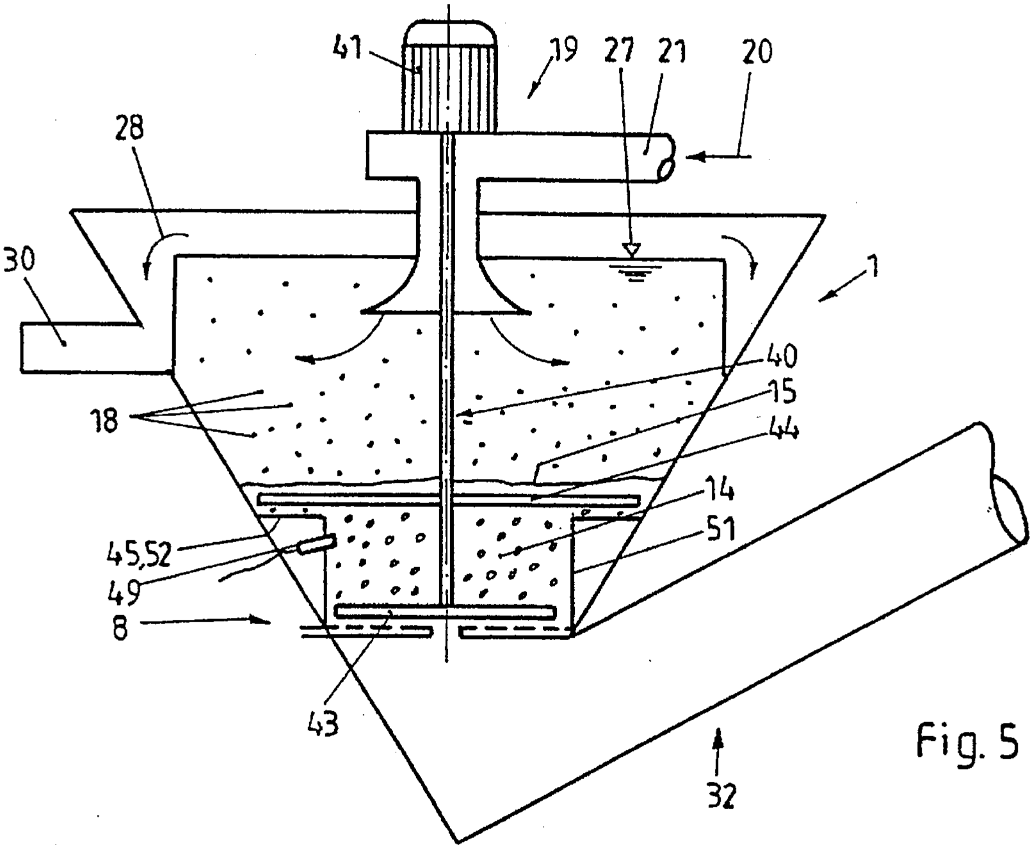
FIG. 5 is a further embodiment of the device.

The embodiment of FIG. 5, contrary to the embodiment of FIG. 4, has an exceptional feature. An substantially cylindrically designed insert 51 is provided extending in its upper region to a ring-like surface 52, which fulfills the function of the supporting plate 45. Here also is an allocation to the agitator blades 44 of the stirring apparatus 40. The diameter of the insert 51 is adapted to the diameter of the perforated base 8. The fluidized sand bed 14 is extended substantially over the height of the insert 51. The advantage of this embodiment is that the insert 51 an the adapted perforated base 8 are positioned in the container 1 to be replaced, if devices of different size and for different amounts of material have to be available. The fluidized sand bed 14 is extended up to the limit 15 so that two regions of different speed may be formed within the fluidized bed 14.

Figure 6:
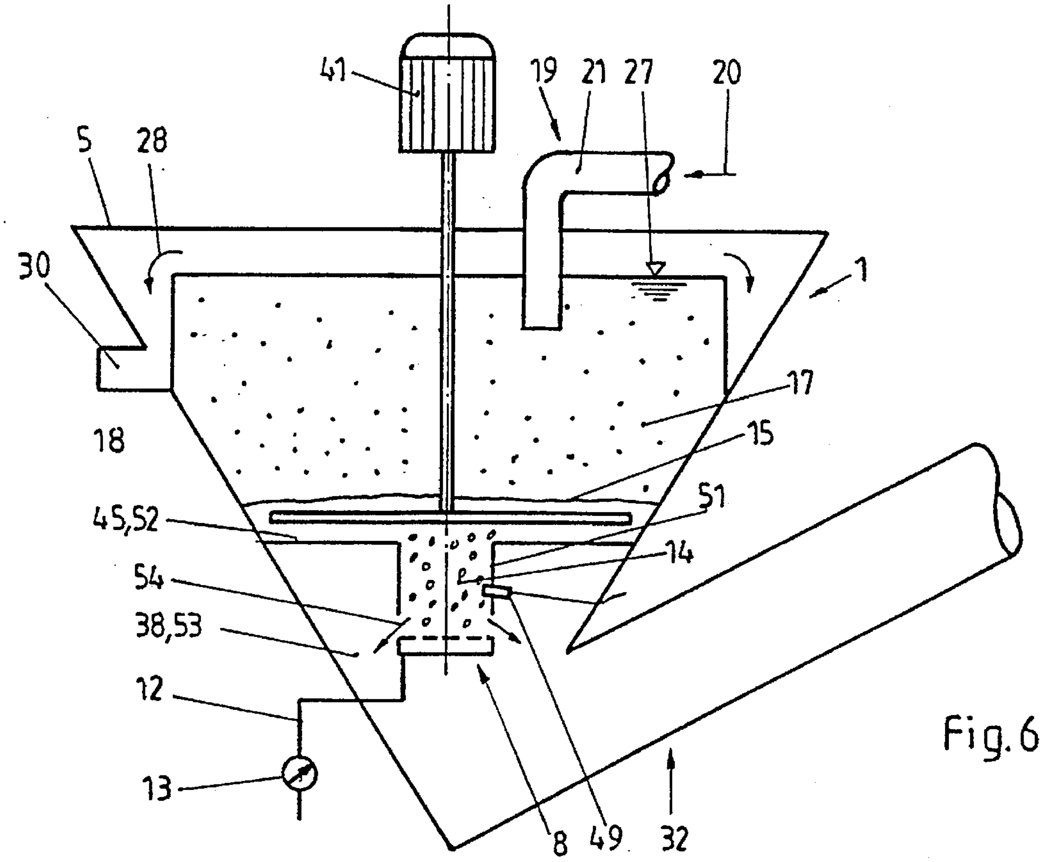
FIG. 6 is a further embodiment of the device.

FIG. 6 illustrates the device of FIG. 5, but with an insert 51 having a comparatively smaller diameter and allocated to a perforated base 8 which has a smaller diameter than the outer diameter of the container 1 at this point. Thus, a ring-like pass through area 53 is created which has the function of the by-pass 38 so that sand particles 16 from the fluidized bed pass in direction of arrow 54 and are conveyed by extractor device 32.

Figure 7:
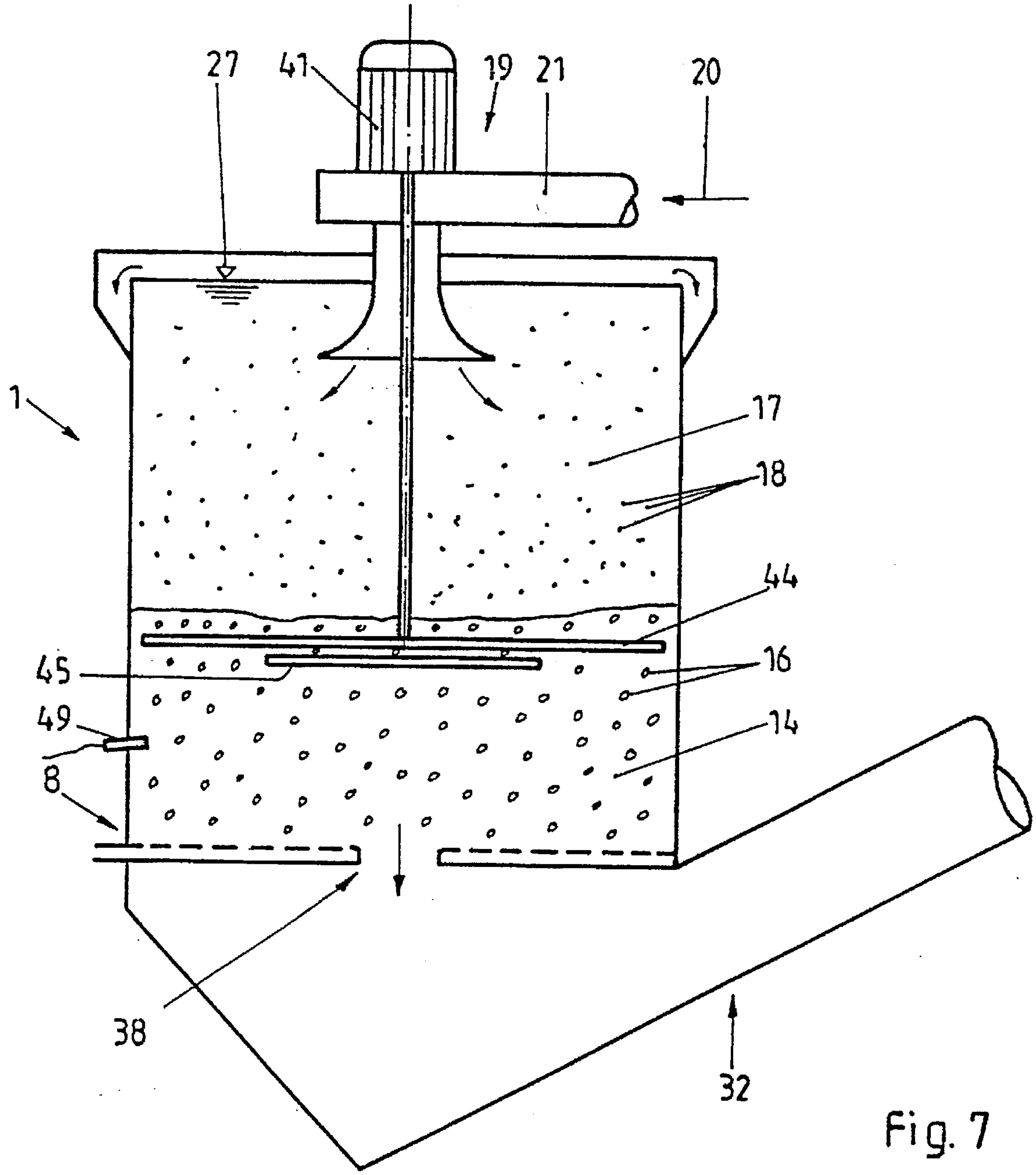
FIG. 7 is still a further modification of the device.

The embodiment of the device of FIG. 7 is similar to the embodiments described above. The container 1 comprises a substantially cylindrical housing, at least in the region of the fluidized bed 14 and the collecting chamber 17. The supporting plate 45 here also cooperates with the agitator blades 44 of the stirring apparatus 40.

Figure 8:
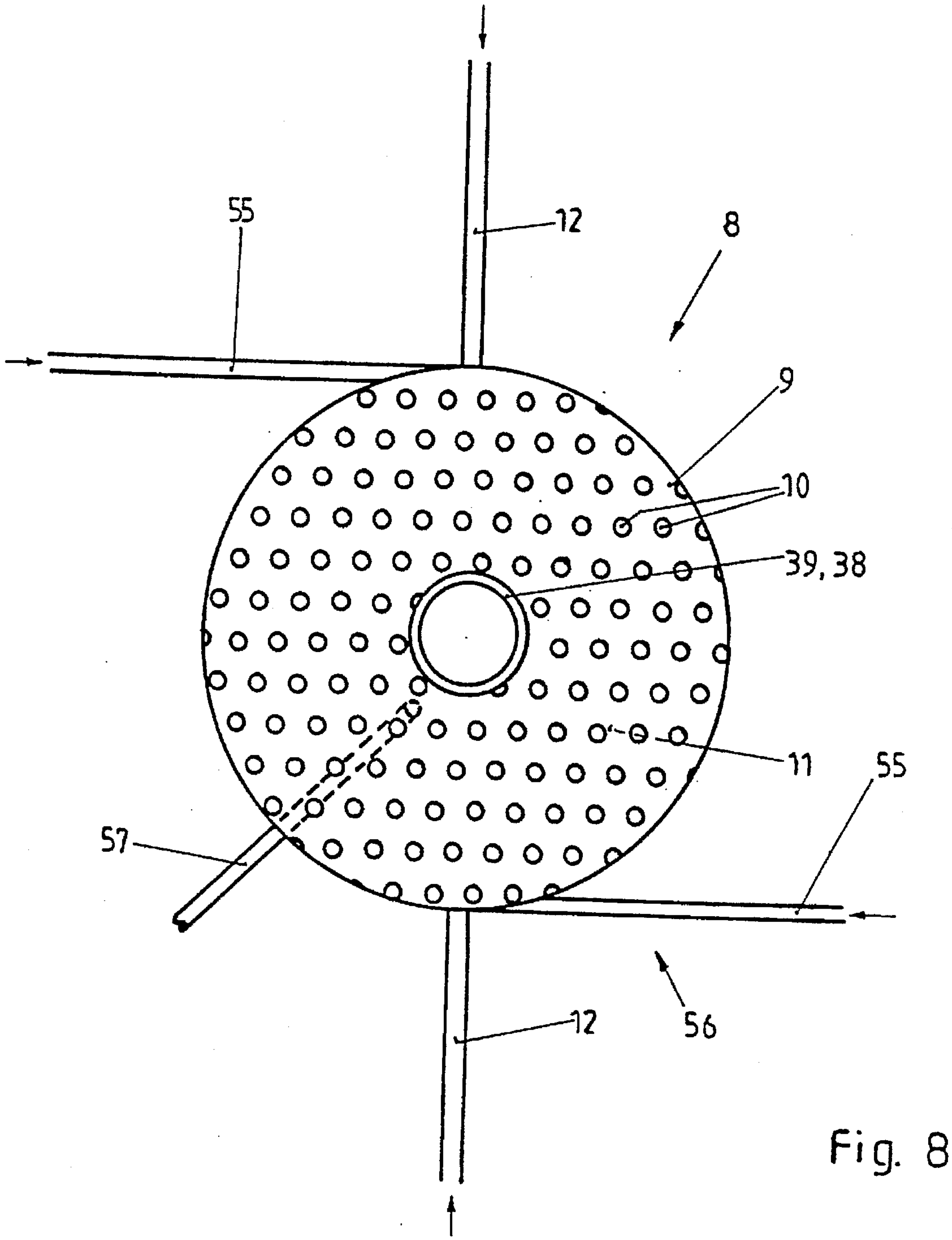
FIG. 8 is a schematical top view of the perforated base.

FIG. 8 shows a view on top of the perforated base 8 with its upper wall 9, in which the nozzle-like openings 10 are positioned in an uniformly distributed manner. The tube 39 is provided in the middle and forms the by-pass 38. Two pipes 12 are illustrated, through which normally liquid flows via the pump 13 into the interior of perforated base 8 between the walls 9 and 11 and is ejected through the openings 10 in upward direction. Two cleaning pipes 55 of a backwashing cleaning device 56 are shown in tangential arrangement to the perforated base 8 and connected with the interior of the perforated base 8 between the walls 9 and 1i. Sand may be backwashed which has set during normal operation within the perforated base 8 via a connection 57 shown schematically. Thus, the uniform generation of the fluidized bed 14 is again possible during normal conditions.

Figure 9:
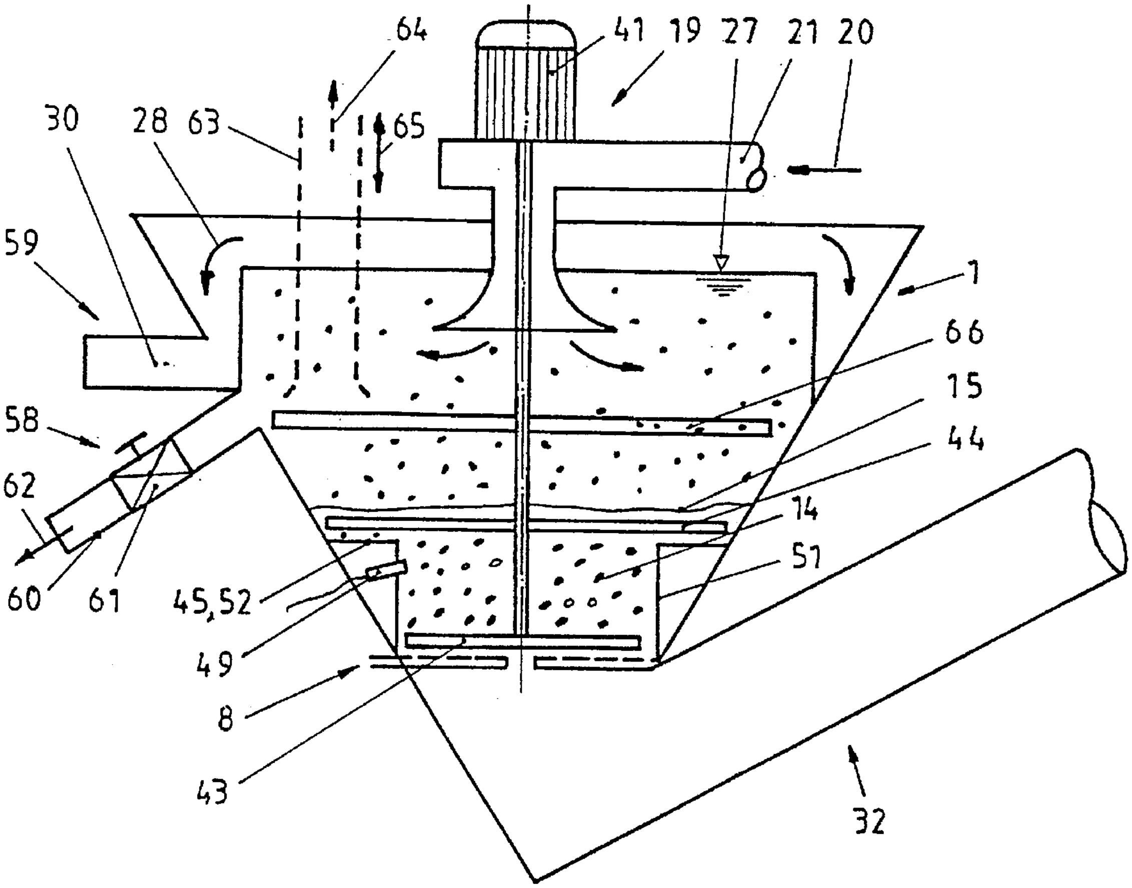
FIG. 9 is a further modification of the device.

In FIG. 9 a device is illustrated, which is similar to the embodiment of FIG. 5. However, a first extractor device 58 is provided here substantially for the extract of the organic material with the liquid. A second extractor device 59 serves for the extract of the liquid containing also organic material. The device 29 is split into two separate extractor devices, which will be operated in different manner. The extractor device 58 is actuated intermittently and the extractor device 59 is actuated continuously. The separate first extractor device 58 serves to avoid a too large concentration of organic material within collecting chamber 17. Otherwise there is the danger that with large amount of polluted fluid on the one hand the degree of pollution of the inorganic material increases, i.e. the desired cleaning effect occurs only insufficiently, and on the other hand more and more fine sands are extracted with the liquid. The first extractor device 58 is provided to avoid this, which may comprise a fixed tube 60 extending through the wall 4 of the container 1 and thus being directly connected with the collecting chamber 17 for the organic material. A valve 61 is positioned in the tube 60 in order to make intermittent extraction of organic material possible in direction of arrow 62. Instead of a fixed tube 60 a suction pipe 63 may be provided, illustrated in dotted lines. The suction pipe 63 extends vertically into the collecting chamber 17 and makes it possible to extract the organic material in direction of arrow 64. The suction pipe 63 and its end extending into the collecting chamber 17 maybe positioned adjustable in height in direction of double arrow 65 in order to make the extraction of organic material possible at different levels. The intermittent extraction of organic material may be performed in times when the stirring apparatus 40 is not driven, thus an extraction is possible in the region of a further agitator blade 66 arranged on the shaft 41 in the collecting chamber 17 and even below this agitator blade 66.

In principle the splitting up of the device 29 into two separate extractor devices 58 and 59 is possible in all embodiments of the device. It is necessary to position the extractor device 58 in a distance to the fluidized bed 14 to extract the sand with the organic material as little as possible.

I claim:

1. A device for separating constituents of a fluid, wherein the fluid includes water and inorganic sand material polluted by organic sewage material, said device comprising:

- a circular-shaped container having an outside wall and upper and lower regions, the upper region including a feed device for the introduction of the fluid into the container;
- an extractor device for extracting the inorganic sand material from the organic material and water, said extractor positioned in the lower container region;
- a fluidized sand bed having said therein and upper and lower portions, wherein the fluidized sand bed is disposed in the lower region of the container for separating the organic material and water from the inorganic sand material;
- a perforated base disposed in the lower container region for distributing an upward flow of liquid through the said bed to keep said fluidized sand bed in motion;
- a collector device having upper and lower portions, wherein the collector is disposed above the fluidized sand bed for collecting the organic material and water; and
- a by-pass for transferring part of the sand from the fluidized sand bed into the extractor device in the lower container region.

2. The device of claim 1, wherein the feed device is positioned in a middle portion of the container and comprises a spinning chamber, a gravity pipe, and a trumpet-shaped diffusor.

3. The device of claim 1, wherein the container is provided with a collecting chamber for the organic material, positioned directly above the fluidized sand bed and having a cross-section which widens in upward direction.

4. The device of claim 1, wherein a stirring apparatus is provided within the container, the stirring apparatus having movable agitator blades which are positioned in the lower portion of the fluidized sand bed.

5. The device of claim 4, wherein a supporting plate having a closed surface is positioned horizontally within the container and is located adjacent to an agitator blade of the stirring apparatus.

6. The device of claim 1, wherein the perforated base includes:

- an upper wall including a number of openings extending therethrough wherein said openings are uniformly distributed over the upper wall;
- a closed lower wall disposed below said upper wall; and
- a tube extending through the upper and lower walls of the perforated base form the by-pass.

7. The device of claim 6, further including:

- a pipe in fluid communication with the perforated base; and
- a pump in fluid communication with the pipe, wherein the pump moves fluid through the pipe to generate an upward fluid flow for the fluidization of the sand bed.

8. The device of claim 7, wherein a substantially cylindrically shaped insert is provided with the container and attached to the perforated base, wherein the insert limits a vertical extent of the fluidized sand bed.

9. The device of claim 8, wherein the fluidized sand bed has an extension height of about 20 to 40 cm.

10. The device of claim 6, further including:

- a valve in the tube extending through the perforated base; and
- a pressure sensor disposed in the container and in fluid communication with the fluidized sand bed; and
- wherein the valve is responsive to the pressure sensor for keeping an extension height of the fluidized sand bed substantially constant.

11. The device of claim 6, wherein the perforated base is provided with a backwashing cleaning device.

12. The device of claim 1 further including;

- a second extractor device disposed in said container for extracting the organic material, and water.

13. The device of claim 12, wherein the second extractor device for the organic material and water comprises a tube extending through the outside wall to the container near the collector.

14. The device of claim 12, wherein the second extractor device for the organic material and water comprises a suction pipe extending in a substantially vertical direction into the collector.

15. The device of claim 1, further including a stirring device including movable agitator blades positioned in the lower portion of the collector.

16. A device for separating constituents of a fluid, wherein the fluid includes water and inorganic sand material polluted by organic sewage material, said device comprising:

- a circular-shaped container having an outside wall and upper and lower regions, the upper region including a feed device for the introduction of the fluid into the container;

an extractor device for extracting the inorganic sand material from the organic material and water, said extractor positioned in the lower container region;

a fluidized sand bed having sand therein and upper and lower portions, wherein the fluidized sand bed is disposed is disposed in the lower region of the container for separating the organic material and water from the inorganic sand material;

a perforated base disposed in the lower container region for distributing an upward flow of liquid through the said bed to keep said fluidized sand bed in motion;

a collector device having upper and lower portions, wherein the collector is disposed above the fluidized sand bed for collecting the organic material; and water a stirring apparatus disposed within the container and including movable agitator blades positioned in the lower portion of the fluidized sand bed; and a bypass for transferring part of the sand from the fluidized sand bed into the extractor device in the lower container region.

* * * * *